(12) United States Patent
Quayle (10) Patent No.: US 9,367,656 B1
(45) Date of Patent: Jun. 14, 2016

(54) METHOD AND APPARATUS FOR SYNCHRONIZING CIRCUITS IN AN EMULATION SYSTEM UTILIZING ITS SERIAL INTERCONNECT NETWORK

(71) Applicant: Cadence Design Systems, Inc., San Jose, CA (US)

(72) Inventor: Barton L. Quayle, San Jose, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 799 days.

(21) Appl. No.: 13/717,172

(22) Filed: Dec. 17, 2012

(51) Int. Cl.
*G06F 9/455* (2006.01)
*G06F 17/50* (2006.01)

(52) U.S. Cl.
CPC .................. *G06F 17/5031* (2013.01)

(58) Field of Classification Search
None
See application file for complete search history.

(56) References Cited

U.S. PATENT DOCUMENTS

| | | | | |
|---|---|---|---|---|
| 6,694,464 B1 * | 2/2004 | Quayle | .............. | G01R 31/2853 714/725 |
| 6,925,431 B1 * | 8/2005 | Papaefstathiou | .... | G06F 17/5022 703/17 |
| 2005/0102545 A1 * | 5/2005 | Clavequin | ................. | G06F 1/12 713/401 |
| 2006/0161418 A1 * | 7/2006 | Ruedinger | .......... | G06F 17/5027 703/25 |
| 2007/0282589 A1 * | 12/2007 | Bershteyn | ............. | G06F 11/261 703/23 |
| 2008/0184024 A1 * | 7/2008 | Nicklaus | .................. | G06F 9/46 713/2 |
| 2011/0013650 A1 * | 1/2011 | McElvain | ........... | G06F 17/5045 370/503 |

OTHER PUBLICATIONS

Berger et al. High-Speed Source-Synchronous Interface for the IMB System z9 Processor IBM J. Res. & Dev. vol. 51, No. 1/2, Jan./Mar. 2007.*

* cited by examiner

*Primary Examiner* — Omar Fernandez Rivas
*Assistant Examiner* — Cuong Luu
(74) *Attorney, Agent, or Firm* — Kaye Scholer LLP (57) ABSTRACT

Clock distribution schemes in emulation systems are typically complex and use significant resources. The present disclosure is generally directed to clock distribution to emulation chips using a serial interconnect mesh. A clock distribution tree is overlayed on the emulation chips allocated to a user's circuit design, the tree branching from a root emulation chip using selected serial interconnections and covering each allocated emulation chip. The emulation chips can recover a clock from received serial signals. The delay associated with each interconnection is determined and used by configuration software when creating the distribution tree. To start emulation stepping synchronously, each emulation chip is configured to know its delay from the root emulation chip. A message is sent from the root emulation chip to each branch emulation chip triggering a timer to countdown a time until emulation is to begin, allowing the emulation chips to start stepping in lockstep.

23 Claims, 4 Drawing Sheets

METHOD AND APPARATUS FOR SYNCHRONIZING CIRCUITS IN AN EMULATION SYSTEM UTILIZING ITS SERIAL INTERCONNECT NETWORK

FIELD

The present patent document relates generally to processor-based hardware verification systems. In particular, the present patent document relates to synchronizing circuits in an emulation system using the emulation system's serial interconnect network.

BACKGROUND

Hardware emulators are programmable devices used to verify hardware circuit designs and integrated circuits having very high logic densities, i.e. large numbers of logic gates. A common method of design verification is to use processor-based hardware emulators to emulate the design prior to physically manufacturing the integrated circuit embodying the circuit design. These processor-based emulators sequentially evaluate combinatorial logic levels in the circuit design under verification, starting at the inputs and proceeding to the outputs. Each pass through the entire set of logic levels is known as a cycle; the evaluation of each individual logic level is known as an emulation step.

Hardware emulators allow engineers and hardware designers to test and verify the operation of an integrated circuit, an entire board of integrated circuits, or an entire system without having to first physically fabricate the hardware. The complexity and number of logic gates present on an integrated circuit increases significantly every year. In order to emulate such large, high-gate-count, integrated circuits, processor-based hardware emulators now commonly contain dozens or hundreds of emulation chips, each emulation chip containing hundreds or thousands of processors. The emulation chips must efficiently communicate in the process of emulating the design under verification. The term "emulation chip" is used broadly to include both monolithic integrated circuits as well and multi-chip packages. These emulation chips themselves are generally ASICs, designed or configured specifically for use in emulation.

As emulation systems continue to grow in size and complexity, the bandwidth requirements of the controlling interface grows. The latency requirements of the interface also tighten. In current emulation systems, the various emulation chips and other circuit components of the emulation system are often interconnected in a mesh network of packetized serial links. The emulation chips operate with a synchronous clock, such that the individual emulation chips operate in lockstep with each other, starting and stopping synchronously. The synchronous clock is transmitted from a common point where it is generated, and distributed to each of the emulation chips. The emulation chips can then communicate using that common clock signal. Signals are launched on a clock edge in one chip and captured on some future clock edge in a second chip. The frequency of that clock defines the bandwidth of the interconnect wires, which frequency is limited by the size and accuracy of the clock distribution scheme. In order to synchronize the various chips, such that they can start stepping operations at the same time, a synchronized signal is sent simultaneously to all the emulation chips. The distribution network for this synchronization signal is often complex and limits the signaling frequency. As a result, more efficient means of synchronization are desired.

SUMMARY

A method and apparatus for synchronizing emulation chips in an emulation system utilizing the emulation system's serial interconnect network is disclosed.

An embodiment includes a computer-implemented method of synchronizing a hardware functional verification system having a plurality of emulation chips, including a root emulation chip and a plurality of branch emulation chips, and having an interconnect mesh connecting each emulation chip to at least one other emulation chip, wherein the root emulation chip and the plurality of branch emulation chips are each programmed with a portion of a hardware circuit design, the method comprising: defining a distribution tree covering the root emulation chip and the plurality of branch emulation chips, wherein the distribution tree comprises a plurality of branch interconnections of the interconnect mesh, wherein each branch interconnection connects either two branch emulation chips or a branch emulation chip and the root emulation chip, wherein the distribution tree is configured to carry a start stepping message away from the root emulation chip, and wherein each branch emulation chip is configured to receive the start stepping message from only one of either the root emulation chip or a branch emulation chip; calculating, for each branch emulation chip, a distance in time between the branch emulation chip and the root emulation chip; transmitting the start stepping message to the distribution tree from the root emulation chip; and delaying, for each of the plurality of branch emulation chips and the root emulation chip, a start of emulation stepping for a predetermined number of clock cycles selected to be greater than the distance in time and so that emulation starts synchronously in the root emulation chip and each branch emulation chip.

In another embodiment the interconnect mesh comprises a plurality of source-synchronous serial interconnects.

In another embodiment the plurality of source-synchronous serial interconnects conform to an IBM Elastic Interface standard.

In another embodiment the distribution tree is a minimum spanning tree.

In another embodiment the method further comprises recovering a first clock signal for a first branch emulation chip of the plurality of branch emulation chips from a first serial data signal received at the first branch emulation chip from a first branch interconnection; and recovering a second clock signal for a second branch emulation chip of the plurality of branch emulation chips from a second serial data signal received at the second branch emulation chip from a second branch interconnection.

In another embodiment the first clock signal has the same frequency as the second clock signal.

In another embodiment the predetermined number of clock cycles for the root emulation chip is substantially equal to a transmission delay from the root emulation chip to the branch emulation chip of the plurality of branch emulation chips that is farthest in time from the root emulation chip.

In another embodiment emulation starts in a branch emulation chip of the plurality of branch emulation chips that is farthest in time from the root emulation chip immediately after the farthest branch emulation chip receives the start stepping message.

According to an embodiment a computer-readable non-transitory storage medium having stored thereon a plurality of instructions, the plurality of instructions when executed by a computer, cause the computer to perform defining a distribution tree covering a root emulation chip and a plurality of branch emulation chips in a hardware functional verification system having a plurality of emulation chips, including the root emulation chip and the plurality of branch emulation chips, and having an interconnect mesh connecting each emulation chip to at least one other emulation chip, wherein the root emulation chip and the plurality of branch emulation chips are each programmed with a portion of a hardware circuit design, wherein the distribution tree comprises a plurality of branch interconnections of the interconnect mesh, wherein each branch interconnection connects either two branch emulation chips or a branch emulation chip and the root emulation chip, wherein the distribution tree is configured to carry a start stepping message away from the root emulation chip, and wherein each branch emulation chip is configured to receive the start stepping message from only one of either the root emulation chip or a branch emulation chip; calculating, for each branch emulation chip, a distance in time between the branch emulation chip and the root emulation chip; transmitting the start stepping message to the distribution tree from the root emulation chip; and delaying, for each of the plurality of branch emulation chips and the root emulation chip, a start of emulation stepping for a predetermined number of clock cycles selected to be greater than the distance in time and so that emulation starts synchronously in the root emulation chip and each branch emulation chip.

In another embodiment the interconnect mesh comprises a plurality of source-synchronous serial interconnects.

In another embodiment the plurality of source-synchronous serial interconnects conform to an IBM Elastic Interface standard.

In another embodiment the distribution tree is a minimum spanning tree.

In another embodiment the plurality of instructions when executed by a computer cause the computer to further perform: recovering a first clock signal for a first branch emulation chip of the plurality of branch emulation chips from a first serial data signal received at the first branch emulation chip from a first branch interconnection; and recovering a second clock signal for a second branch emulation chip of the plurality of branch emulation chips from a second serial data signal received at the second branch emulation chip from a second branch interconnection.

In another embodiment the first clock signal has the same frequency as the second clock signal.

In another embodiment the predetermined number of clock cycles for the root emulation chip is substantially equal to a transmission delay from the root emulation chip to the branch emulation chip of the plurality of branch emulation chips that is farthest in time from the root emulation chip.

In another embodiment emulation starts in a branch emulation chip of the plurality of branch emulation chips that is farthest in time from the root emulation chip immediately after the farthest branch emulation chip receives the start stepping message.

According to an embodiment a hardware functional verification system having a plurality of emulation resources, comprises: a plurality of emulation chips, including a root emulation chip and a plurality of branch emulation chips; an interconnect mesh interconnecting the plurality of emulation chips, including a plurality of branch interconnections configured as a distribution tree, wherein each branch interconnection connects either two branch emulation chips or a branch emulation chip and the root emulation chip, wherein each branch interconnection is configured to carry away from the root emulation chip a message containing information about a time that emulation stepping is to commence in the root emulation chip and the plurality of branch emulation chips, and wherein each branch emulation chip is configured to receive the start stepping message from only one of the root emulation chip or another branch emulation chip; and a timer in each branch emulation chip of the plurality of branch emulation chips, the timer configured to count from a time that the branch emulation chip receives the start stepping message to the time emulation stepping is to commence based on a message delay between the root emulation chip and the branch emulation chip.

In another embodiment the interconnect mesh comprises a plurality of source-synchronous serial interconnects.

In another embodiment the plurality of source-synchronous serial interconnects conform to an IBM Elastic Interface standard.

In another embodiment the distribution tree is a minimum spanning tree.

In another embodiment the hardware functional verification system further comprises: a first clock recovery circuit in a first branch emulation chip of the plurality of branch emulation chips configured to derive a first clock signal for the first branch emulation chip from a first serial data signal to be received from a first branch interconnection; and a second clock recovery circuit in a second branch emulation chip of the plurality of branch emulation chips configured to derive a second clock signal for the second branch emulation chip from a second serial data signal to be received from a second branch interconnection.

In another embodiment the first clock signal is designed to have the same frequency as the second clock signal.

In another embodiment the hardware functional verification system further comprises a timer of the root emulation chip configured to count for a time substantially equal to a message delay between the root emulation chip and a branch emulation chip of the plurality of branch emulation chips that is farthest in time from the root emulation chip.

The above and other preferred features described herein, including various novel details of implementation and combination of elements, will now be more particularly described with reference to the accompanying drawings and pointed out in the claims. It will be understood that the particular methods and apparatuses are shown by way of illustration only and not as limitations of the claims. As will be understood by those skilled in the art, the principles and features of the teachings herein may be employed in various and numerous embodiments without departing from the scope of the claims.

BRIEF DESCRIPTION OF THE DRAWINGS

The accompanying drawings, which are included as part of the present specification, illustrate the presently preferred embodiments and together with the general description given above and the detailed description of the preferred embodiments given below serve to explain and teach the principles described herein.

The figures are not necessarily drawn to scale and the elements of similar structures or functions are generally represented by like reference numerals for illustrative purposes throughout the figures. The figures are only intended to facilitate the description of the various embodiments described herein; the figures do not describe every aspect of the teachings disclosed herein and do not limit the scope of the claims.

DETAILED DESCRIPTION

A method and apparatus for synchronizing emulation chips in an emulation system utilizing the emulation system's serial interconnect network is disclosed. Each of the features and teachings disclosed herein can be utilized separately or in conjunction with other features and teachings. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

In the following description, for purposes of explanation only, specific nomenclature is set forth to provide a thorough understanding of the various embodiments described herein. However, it will be apparent to one skilled in the art that these specific details are not required to practice the concepts described herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Also disclosed is an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the present teachings.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Figure 1:
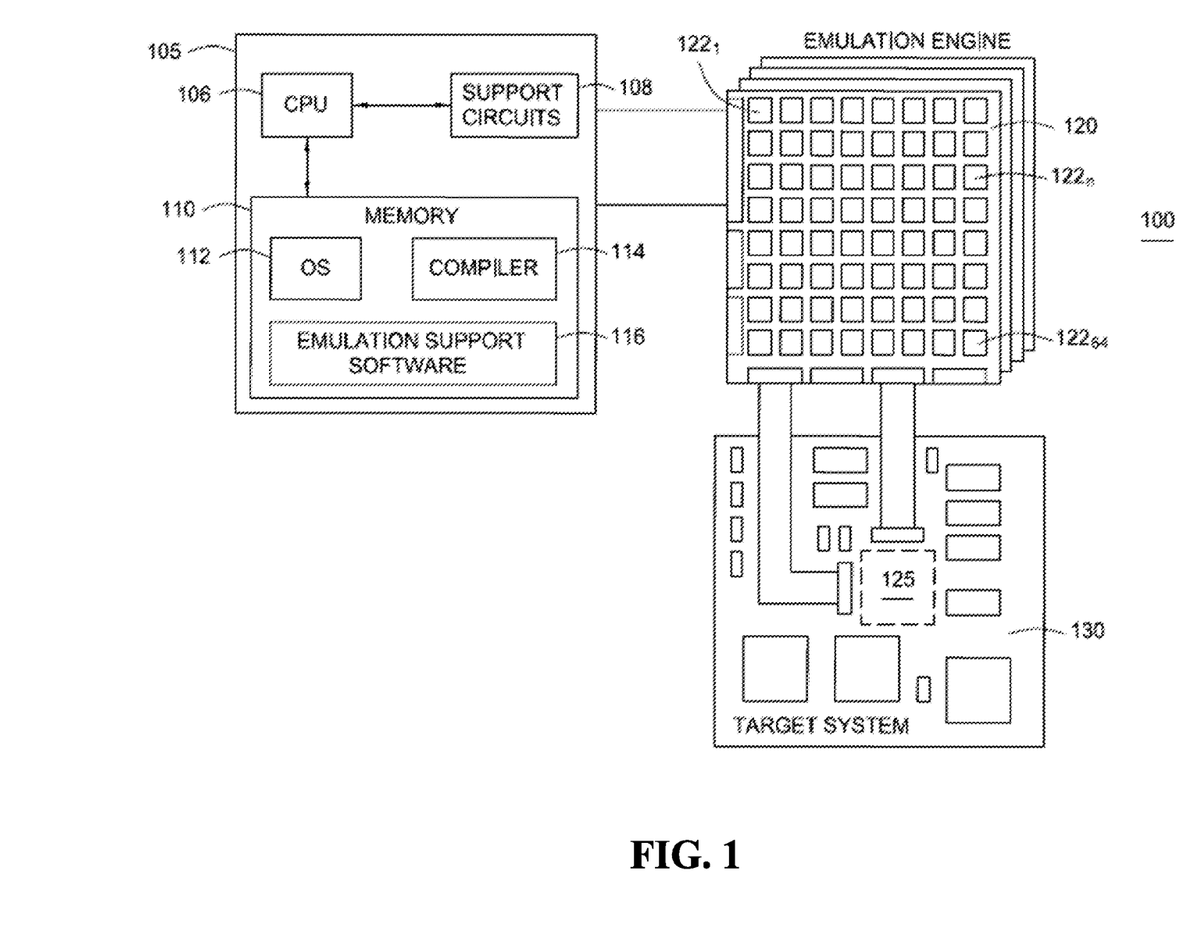
FIG. 1 is an illustration of a processor-based hardware emulation system.

FIG. 1 depicts an overview of an emulation system 100. The system comprises a host computer workstation 105, an emulation engine including emulation board 120, and a target system 130.

The computer workstation 105 provides emulation support facilities to the emulation engine 100 and emulation board 120. The computer workstation 105, for example a personal computer, comprises at least one central processing unit (CPU) 106, support circuits 108, and a memory 110. The CPU 106 may comprise one or more conventionally available microprocessors and/or microcontrollers. The support circuits 108 are well known circuits that are used to support the operation of the CPU 106. These supporting circuits comprise power supplies, clocks, input/output interface circuitry, cache, and other similar circuits.

Memory 110, sometimes referred to as main memory, may comprise random access memory, read only memory, disk memory, flash memory, optical storage, and/or various combinations of these types of memory. Memory 110 may in part be used as cache memory or buffer memory. Memory 110 stores various forms of software and files for the emulation system, such as an operating system (OS) 112, a compiler 114, and emulation support software 116. The compiler 114 converts a hardware design, such as hardware described in VHDL or Verilog, to a sequence of instructions that can be evaluated by the emulation board 120.

The computer workstation 105 allows a user to interface with the emulation engine 100, including emulation board 120, and configure and control the emulation process and collect emulation results for analysis. The workstation runs software that configures and manages the allocation of emulation resources. Under control of the computer workstation 105, programming information and data is loaded to the emulation engine 100. The emulation board 120 has on it a number of individual emulation chips, for example the sixty-four emulation chips $122_1$ to $122_{64}$ (collectively 122), in addition to miscellaneous support circuitry. The term "emulation chip" is used broadly to include both monolithic integrated circuits as well and multi-chip packages.

In response to programming received from the emulation support software 116, emulation engine emulates a portion 125 of the target system 130. Portion 125 of the target system 130 may be an integrated circuit, a memory, a processor, or any other object or device that may be emulated in a programming language. Exemplary emulation programming languages include Verilog and VHDL.

Figure 2:
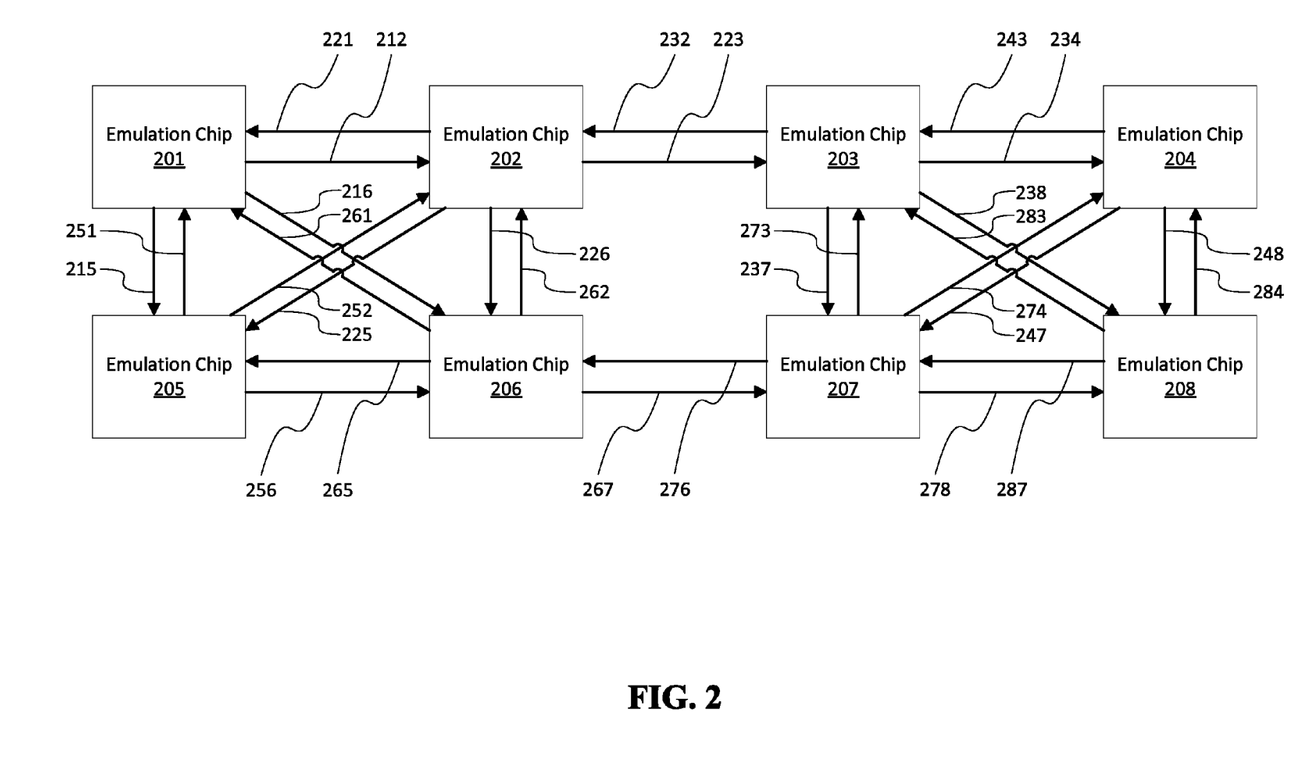
FIG. 2 is an illustration an interconnect mesh connecting emulation chips of an emulation system.

FIG. 2 illustrates eight emulation chips 201 through 208, connected with a set of interconnections, according to an embodiment. In this embodiment, the interconnect is a system of high-speed, packetized serial interconnects. Certain pairs of emulation chips from emulation chips 201 through 208 are connected with interconnection. Here, emulation chips 201 and 202 are connected with a interconnection from emulation chip 201 to emulation chip 202 by interconnection 212, and from emulation chip 202 to emulation chip 201 by interconnection 221. Emulation chips 202 and emulation chip 203 are connected with a serial interconnection from emulation chip 202 to emulation chip 203 by interconnection 223, and from emulation chip 203 to 202 by interconnection 232. In a similar fashion, other interconnections connect other pairs of emulation chips 201 through 208.

The serial interconnect can be any suitable serial interconnect system, for example PCI, IBM's Elastic Interface, or a custom serial connection such as a custom source-synchronous serial connection. In this embodiment, the interconnections are source-synchronous bidirectional serial interconnections. Two different interconnections in FIG. 2 can share a common conductor, for example interconnection 223 and interconnection 232 can be a single bidirectional connection that when transmitting from emulation chip 202 to emulation chip 203 uses interconnection 223 over the conductor, but when transmitting from emulation chip 203 to emulation chip 202 uses interconnection 232 over the same conductor. For ease of understanding, the interconnects are illustrated with a specific directionality, but some or all of the interconnects can be bidirectional, sharing common conductors between the emulation chips.

The emulation chips have built in circuitry to measure the latency of interconnect when in a reflection mode. The reflection mode circuitry measures the delay across an interconnect between two emulation chips. Configuration management software running on the host workstation manages this process, and receives from the reflection mode circuitry of the various emulation chips the delays associated with each interconnect link. The configuration manager then knows the latency of each interconnect link in the interconnection mesh, and can calculate the delays of any given path from a transmitting emulation chip to a destination emulation chip. For example, the reflection mode circuitry of emulation chip 201 can calculate the delay of interconnection 212 to emulation chip 202. Emulation chip 201 then transmits this data to the configuration manager software. In a particular configuration, this may be three clock cycles, where the clock frequency is 500 MHz. Similarly, emulation chip 202 can calculate the delay of interconnection 223, which may be five clock cycles in a particular configuration. After collecting the reflection data, the configuration manager software can then calculate a signal transmitted from emulation chip 201 to emulation chip 203 on the path of interconnection 212 and interconnection 223 via emulation chip 202 has a latency of eight clock cycles. The calculation of the interconnection latencies can be performed on system power-up or prior to system usage.

Each emulation chip can perform clock recovery using one of the high-speed serial signals that it receives via an interconnect. The recovery process separates the data out from the clock signal. The emulation chip can then use the recovered clock as the system clock for the emulation chip, as well as the transmit clock for each of its transmit links. By using the recovered clock as the system clock for the emulation chip, it is not necessary to send a separate clock signal to the emulation chip.

Figure 3:
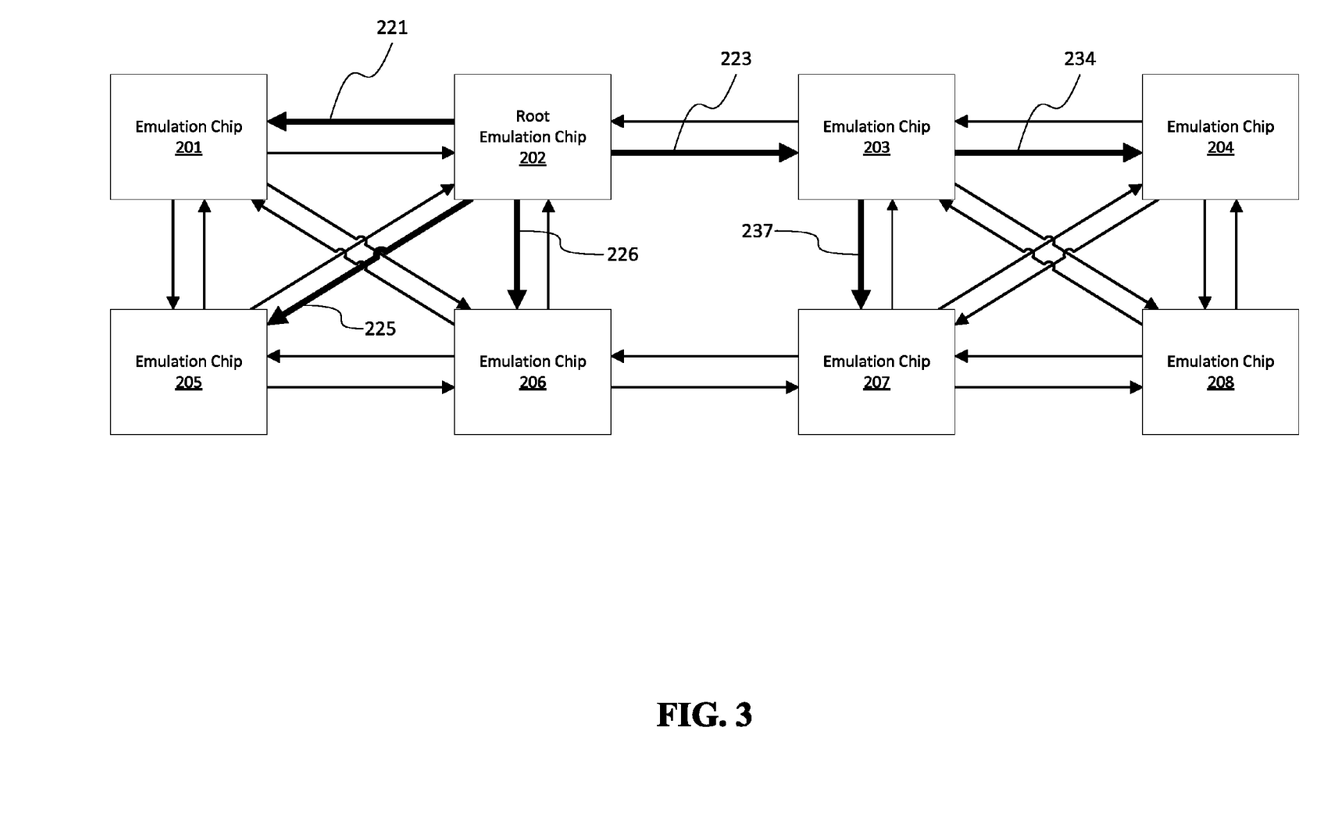
FIG. 3 is an illustration of a distribution tree having a root emulation chip covering selected emulation chips of an emulation system.

FIG. 3 illustrates eight emulation chips 201 through 208 connected with an interconnection mesh, according to an embodiment. In this embodiment, seven of the eight emulation chips, 201 through 207, are allocated to emulate a user's circuit design by the configuration manager software. The allocated emulation chips have a mesh of serial interconnect connecting the emulation chips, defining both upstream and downstream links between the emulation chips. One of emulation chips 201 through 207 is selected to be the root of a distribution tree having a number of branches and sub-branches covering each of the allocated emulation chips. In this embodiment, emulation chip 202 is selected as the root. Root emulation chip 202 is then connected to four other emulation chips using four downstream links. Root emulation chip 202 is connected to emulation chip 201 using downstream link 221, emulation chip 203 using downstream link 223, emulation chip 205 using downstream link 225, and emulation chip 206 using downstream link 226. Emulation chip 203 is further connected to emulation chip 204 using downstream link 234 and emulation chip 207 using downstream link 237. Accordingly, in the distribution tree each emulation chip, other than the root emulation chip, has exactly one upstream connection to another emulation chip, and can have any number of downstream links, including zero downstream links.

Emulation systems generally require that the individual emulation chips in a design subset operate in lockstep, starting and stopping in a synchronized fashion. This results in the inability to pause or stop emulation once it starts The interconnect mesh should be programmably selectable so that they start packet can be forwarded only on particular links that are determined by the chosen subset of chips and the selected branches of the distribution tree. Since the delay is both of the interconnection and of the emulation chip's ability to forward the start-stepping messages with a predictable delay, these values must be predictable for both the serial communication links in the emulation system as well as the emulation chips.

The creation of the distribution tree is performed anew for each user's circuit design. For example, a different distribution tree will be necessary if a user's circuit design uses a different number of emulation chips. Likewise, a different distribution tree will be necessary if the user's circuit design uses the same number emulation chips, but the allocated emulation chips are different, for example emulation chips 202 through 208 instead of emulation chips 201 through 207.

Once the distribution tree is defined, each interconnect link in the tree is identified in the emulation chips at either end as an upstream link or a downstream link. The interconnect links not a part of the tree are left as bidirectional, upstream or downstream. Emulation chips having an upstream link are then configured to derive their clock from the serial signal received from the upstream. Each emulation chip will than transmit on its downstream link, assuming there is a downstream link, according to the clock recovered from its upstream link. Thus, by recovering the clock from the upstream link, each emulation chip allocated to a user's circuit design is running at the same frequency. However, because the latency of the interconnection link will usually not be an exact multiple of a whole clock cycle, the emulation chips will have skewed phase.

The interconnect latency calculations can also be performed after the distribution tree is defined, and the delay associated with the interconnect calculated for some or all of the of the interconnections of the serial interconnect mesh connecting the emulation chips. However, because the creation of the distribution tree is performed anew for different circuit designs having different allocations of emulation chips, it is generally more convenient to calculate the latencies for all of the interconnect at the once, rather than each time a new circuit designs is to be emulated.

With each emulation chip allocated to a user's circuit design now placed within the distribution tree, each chip is initialized with its particular distance D in clock cycles from the root emulation chip, calculated from the known latencies. The known latencies must also include the latency due to the emulation chip passing the message from its upstream link to its downstream link. Typically, the emulation chip delay is a single clock cycle. To start emulation, a "start stepping" message is created by the root emulation chip and sent to each of its downstream interconnect links of the distribution tree toward the branch emulation chips. The message indicates the design will start its emulation stepping in N clock cycles, where N is a whole number larger than the greatest distance in clock cycles from the root to the lowest branch of the distribution tree. In other words, since each emulation chip (other than the root) has a distance D from the root, N is chosen such that N is at least as big as D, i.e. N≥D. As each branch chip receives the "start stepping" message, it will know to start stepping in N minus D clock cycles. Each branch emulation chip also forwards the message to each of its branches, and so on until the message has been passed down all the branches. By the time that N clock cycles have passed, the message will have reached each of the branch emulation chips, which will start stepping on the same clock cycle once N clock cycles have passed from the time the message was initially transmitted from the root emulation chip.

Table 1 lists exemplary delay data for interconnect of the distribution tree illustrated in FIG. 3 (delay for each of the interconnects is given in clock cycles):

TABLE 1

| Interconnection | Delay (clock cycles) |
| --- | --- |
| 221 | 2 |
| 223 | 2 |
| 225 | 3 |
| 226 | 2 |
| 234 | 2 |
| 237 | 2 |

Table 2 lists the values of D for each emulation chip allocated to a user's circuit design as illustrated in FIG. 3 using the delay data of Table 1 where N is selected to be fine:

TABLE 2

| Emulation Chip | D | Cycles Until Start (N-D) |
| --- | --- | --- |
| 202 | 0 | 5 |
| 201 | 2 | 3 |
| 203 | 2 | 3 |
| 205 | 3 | 2 |
| 206 | 2 | 3 |
| 204 | 5 | 0 |
| 207 | 5 | 0 |

Here, D for emulation chip 204 and 207 include the delay associated with an emulation chip passing the message of one clock cycle. In other words, the delay for the "start stepping" message to reach emulation chip 207 is the sum of the delay for interconnection 223 plus the delay for emulation chip 203 plus the delay for interconnection 237, which equals five clock cycles ($D = D_{223} + D_{203} + D_{277} = 2+1+2 = 5$).

The largest distance from the root for any branch emulation chip is five, for emulation chip 207. Therefore, when the root emulation chip 202 transmits its "start stepping" message, it must indicate that emulation will be begin in a number of clock cycles equal to or greater than five. Here, N was chosen to be five. The "Cycles Until Start" for each emulation chip represents the number of cycles that each emulation chip counts after receiving the "start stepping" message before starting emulation steps. Of course, for the root emulation chip 202, the "Cycles Until Start" number represents the number of cycles that a timer of root emulation chip 202 will count after it first transmits the "start stepping" message rather than when it receives the message. As a result, in this scenario, each of emulation chips 201 through 207 will start stepping together five cycles, counted on a timer, after the root emulation chip first transmits the "start stepping" message (with some phase offset).

Once the emulation chips are stepping synchronously, each emulation chip generates its own cycles synchronous to all of the other chips, but with an undefined phase relationship. However, since each of the interconnections are packetized messages on source-synchronous links, the fixed phase offset in the various emulation chip clocks can be compensated for during emulation. Furthermore, all synchronization of breakpoints, starting and stopping user clocks, and sim-combinatorials are performed in scheduled virtual logic, meaning that they can be scheduled for a window or some stop point during emulation.

In another embodiment, the root and branches are selected to optimize the tree. Such optimization can be preferred through the use of a minimum spanning tree having the shortest depth based on the interconnect delays between the emulation chips. Table 3 lists exemplary delay data for the emulation chips and interconnect of FIG. 3:

TABLE 3

| Interconnection | Delay (clock cycles) |
| --- | --- |
| 212 & 221 | 2 |
| 215 & 251 | 2 |
| 216 & 261 | 3 |
| 223 & 232 | 2 |
| 225 & 252 | 3 |
| 226 & 262 | 2 |
| 234 & 243 | 2 |
| 237 & 273 | 2 |
| 238 & 283 | 3 |
| 247 & 274 | 3 |
| 248 & 284 | 2 |
| 256 & 265 | 2 |
| 267 & 276 | 2 |
| 278 & 287 | 2 |

Given the delay data of Table 3, the distribution tree illustrated in FIG. 3 is a minimum spanning tree, where the longest delay is five clock cycles, there is no other distribution tree where the longest delay is less than five, even if other distribution trees with a largest delay of five are also possible. Nonetheless, selecting a different root emulation chip illustrates a non-minimum spanning tree.

Figure 4:
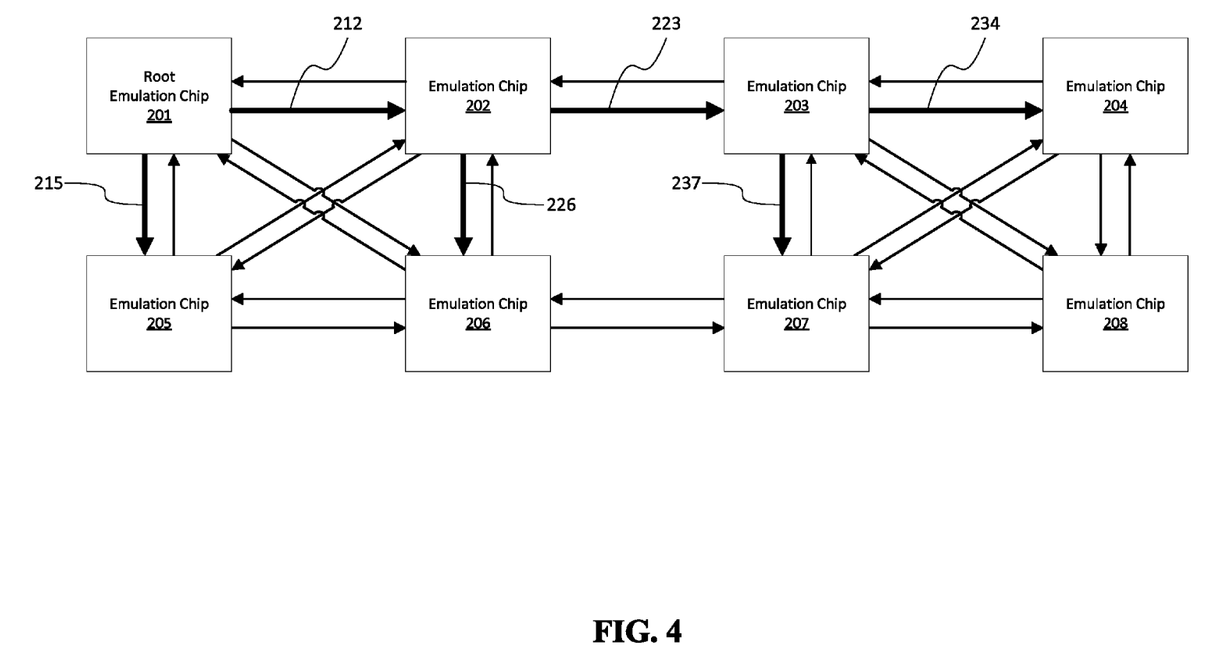
FIG. 4 is an illustration of a distribution tree having a different root emulation chip covering selected emulation chips of an emulation system.

In FIG. 4, emulation chip 201 has been selected as the root of the distribution tree, with the branches selected as shown, namely the distribution tree comprises interconnections 212, 215, 223, 226, 234, and 237 to span emulation chips 201 through 207. Table 4 lists the values of D for each emulation chip 201 through 207 using the delay data of Table 3 (recall that each emulation chip adds a delay of one clock cycle) the values of D are as follows:

TABLE 4

| Emulation Chip | D |
|---|---|
| 201 | 0 |
| 202 | 2 |
| 203 | 5 |
| 204 | 8 |
| 205 | 2 |
| 206 | 5 |
| 207 | 8 |

With the selection of emulation chip 201 as the root and the branches as illustrated in FIG. 4, the longest distance is eight, for both emulation chips 204 and 207 (D=2+1+2+1+2=8). Thus, as in FIG. 3, the root emulation chip and branches can be selected to minimize the longest distance, and thus minimize the number of cycles before stepping is started, saving time and resources.

The disclosed teachings have several advantages. The need for precise and extensive low skew delivery of clocks and synchronization signals to each chip in the emulation systems is eliminated. This reduces the amount of hardware necessary for synchronization, and simplifies the design. It further allows the emulation system to be formed based on how it is interconnected. This approach also allows for subsets of the emulation chips running at different clock frequencies.

Although various embodiments have been described with respect to specific examples and subsystems, it will be apparent to those of ordinary skill in the art that the concepts disclosed herein are not limited to these specific examples or subsystems but extends to other embodiments as well. Included within the scope of these concepts are all of these other embodiments as specified in the claims that follow.

I claim:

1. A computer-implemented method of synchronizing a hardware functional verification system having a plurality of emulation chips, including a root emulation chip and a plurality of branch emulation chips, and having an interconnect mesh connecting each emulation chip to at least one other emulation chip, wherein the root emulation chip and the plurality of branch emulation chips are each programmed with a portion of a hardware circuit design, the method comprising:

defining a distribution tree covering the root emulation chip and the plurality of branch emulation chips, wherein the distribution tree comprises a plurality of branch interconnections of the interconnect mesh, wherein each branch interconnection connects either two branch emulation chips or a branch emulation chip and the root emulation chip, wherein the distribution tree is configured to carry a start stepping message away from the root emulation chip, and wherein each branch emulation chip is configured to receive the start stepping message from only one of either the root emulation chip or a branch emulation chip;

calculating, for each branch emulation chip, a distance in time between the branch emulation chip and the root emulation chip;

transmitting the start stepping message to the distribution tree from the root emulation chip;

delaying, for each of the plurality of branch emulation chip a start of emulation stepping for a number of clock cycles, the number of clock cycles for each of a selected one of the plurality of branch emulation chips being a difference between (i) a number selected to be greater than or equal to a maximum distance in time, the maximum distance in time being a number of clock cycles from the root emulation chip to a lowest branch of the plurality of branch emulation chips, and (ii) a distance in time, the distance in time being a number of clock cycles from the root emulation chip to the selected one of the plurality of branch emulation chips and the root emulation chip; and delaying, for the root emulation chip, the start of emulation stepping for a predetermined number, the predetermined number of clock cycles being a number selected to be greater than or equal to the maximum distance in time, so that emulation starts synchronously in the root emulation chip and each branch emulation chip.

2. The method of claim 1, wherein the interconnect mesh comprises a plurality of source-synchronous serial interconnects.

3. The method of claim 2, wherein the plurality of source-synchronous serial interconnects conform to an IBM Elastic Interface standard.

4. The method of claim 1, wherein the distribution tree is a minimum spanning tree.

5. The method of claim 1, further comprising:

recovering a first clock signal for a first branch emulation chip of the plurality of branch emulation chips from a first serial data signal received at the first branch emulation chip from a first branch interconnection; and recovering a second dock signal for a second branch emulation chip of the plurality of branch emulation chips from a second serial data signal received at the second branch emulation chip from a second branch interconnection.

6. The method of claim 5, wherein the first clock signal has the same frequency as the second clock signal.

7. The method of claim 1, wherein the predetermined number of clock cycles for the root emulation chip is equal to a transmission delay from the root emulation chip to the branch emulation chip of the plurality of branch emulation chips that is farthest in time from the root emulation chip.

8. The method of claim 1, wherein emulation starts in a branch emulation chip of the plurality of branch emulation chips that is farthest in time from the root emulation chip.

9. A computer-readable non-transitory storage medium having stored thereon a plurality of instructions, the plurality of instructions when executed by a computer, cause the computer to perforate:

defining a distribution tree covering a root emulation, chip and a plurality of branch emulation chips in a hardware functional verification system having a plurality of emulation chips, including the root emulation chip and the plurality of branch emulation chips, and having an interconnect mesh connecting each emulation chip to at least one other emulation chip, wherein the root emulation chip and the plurality of branch emulation chips are each programmed with a portion of a hardware circuit design, wherein the distribution tree comprises a plurality of branch interconnections of the interconnect mesh, wherein each branch interconnection connects either two branch emulation chips or a branch emulation chip and the root emulation chip, wherein the distribution tree is configured to carry a start stepping message away from the root emulation chip, and wherein each branch emulation chip is configured to receive the start stepping message from only one of either the root emulation chip or a branch emulation chip;

calculating, for each branch emulation chip, a distance in time between the branch emulation chip and the root emulation chip;

transmitting the start stepping message to the distribution tree from the root emulation chip;

delaying, for each of the plurality of branch emulation chip a start of emulation stepping for a number of clock cycles, the number of clock cycles for each of a selected one of the plurality of branch emulation chips being a difference between (i) a number selected to be greater than or equal to a maximum distance in time, the maximum distance in time being a number of clock cycles from the root emulation chip to a lowest branch of the plurality of branch emulation chips, and (ii) a distance in time, the distance in time being a number of clock cycles from the root emulation chip to the selected one of the plurality of branch emulation chips and the root emulation chip; and delaying, for the root emulation chip, the start of emulation stepping for a predetermined number, the predetermined number of clock cycles being a number selected to be greater than or equal to the maximum distance in time, so that emulation starts synchronously in the root emulation chip and each branch emulation chip.

10. The computer-readable non-transitory storage medium of claim 9, wherein the interconnect mesh comprises a plurality of source-synchronous serial interconnects.

11. The computer-readable non-transitory storage medium of claim 10, wherein the plurality of source-synchronous serial interconnects conform to an IBM Elastic Interface standard.

12. The computer-readable non-transitory storage medium of claim 9, wherein the distribution tree is a minimum spanning tree.

13. The computer-readable non-transitory storage medium of claim 9, wherein the plurality of instructions when executed by a computer cause the computer to further perform:

recovering a first clock signal for a first branch emulation chip of the plurality of branch emulation chips from a first serial data signal received at the first branch emulation chip from a first branch interconnection; and recovering a second clock signal for a second branch emulation chip of the plurality of branch emulation chips from a second serial data signal received at the second branch emulation chip from a second branch interconnection.

14. The computer-readable non-transitory storage medium of claim 13, wherein the first clock signal has the same frequency as the second clock signal.

15. The computer-readable non-transitory storage medium of claim 9, wherein the predetermined number of clock cycles for the root emulation chip is equal to a transmission delay from the root emulation chip to the branch emulation chip of the plurality of branch emulation chips that is farthest in time from the root emulation chip.

16. The computer-readable non-transitory storage medium of claim 9, wherein emulation starts in a branch emulation chip of the plurality of branch emulation chips that is farthest in time from the root emulation chip.

17. A hardware functional verification system having a plurality of emulation resources, comprising:

a plurality of emulation chips, including a root emulation chip and a plurality of branch emulation chips;

an interconnect mesh interconnecting the plurality of emulation chips, including a plurality of branch interconnections configured as a distribution tree, wherein each branch interconnection connects either two branch emulation chips or a branch emulation chip and the root emulation chip, wherein each branch interconnection is configured to carry away from the root emulation chip a message containing information about a time that emulation stepping is to commence in the root emulation chip and the plurality' of branch emulation chips, and wherein each branch emulation chip is configured to receive the start stepping message from only one of the root emulation chip or another branch emulation chip; and a timer in each branch emulation chip of the plurality of branch emulation chips, the timer configured to count from a time that the branch emulation chip receives the start stepping message to the time emulation stepping is to commence based on a message delay between the root emulation chip and the branch emulation chip, the message delay being a difference between (i) a number selected to be greater than or equal to a maximum distance in time, the maximum distance in time being a number of clock cycles from the root emulation chip to a lowest branch of the plurality of branch emulation chips, and (ii) a distance in time, the distance in time being a number of clock cycles from the root emulation chip to the selected one of the plurality of branch emulation chips and the root emulation chip.

18. The hardware functional verification system of claim 17, wherein the interconnect mesh comprises a plurality of source-synchronous serial interconnects.

19. The hardware functional verification system of claim 18, wherein the plurality of source-synchronous serial interconnects conform to an IBM Elastic Interface standard.

20. The hardware functional verification system of claim 17, wherein the distribution tree is a minimum spanning tree.

21. The hardware functional verification system of claim 17, further comprising:

a first clock recovery circuit in a first branch emulation chip of the plurality of branch emulation chips configured to derive a first clock signal for the first branch emulation chip from a first serial data signal to be received from a first branch interconnection; and a second clock recovery circuit in a second branch emulation chip of the plurality of branch emulation chips configured to derive a second clock signal for the second branch emulation chip from a second serial data signal to be received from a second branch interconnection.

22. The hardware functional verification system of claim 21, wherein the first clock signal is designed to have the same frequency as the second clock signal.

23. The hardware functional verification system of claim 17, further comprising a timer of the root emulation chip configured to count for a time equal to a message delay between the root emulation chip and a branch emulation chip of the plurality of branch emulation chips that is farthest in time from the root emulation chip.

* * * * *